United States Patent
Andersen (10) Patent No.: US 10,123,544 B2
(45) Date of Patent: Nov. 13, 2018

(54) TOOL FOR REMOVAL OF MEAT PIECES SUCH AS TENDERLOIN FROM A CARCASS

(71) Applicant: Teknologisk Institut, Taastrup (DK)

(72) Inventor: Peter Andersen, Taastrup (DK)

(73) Assignee: TEKNOLOGISK INSTITUT, Taastrup (DK)

( * ) Notice: Subject to any disclaimer, the term of this patent is extended or adjusted under 35 U.S.C. 154(b) by 0 days.

(21) Appl. No.: 15/560,619

(22) PCT Filed: Mar. 23, 2016

(86) PCT No.: PCT/EP2016/056302
§ 371 (c)(1),
(2) Date: Sep. 22, 2017

(87) PCT Pub. No.: WO2016/150984
PCT Pub. Date: Sep. 29, 2016

(65) Prior Publication Data
US 2018/0055062 A1    Mar. 1, 2018

(30) Foreign Application Priority Data
Mar. 24, 2015   (DK) .................. 2015 00178

(51) Int. Cl.
*A22B 5/00* (2006.01)
*A22B 5/16* (2006.01)
(Continued)

(52) U.S. Cl.
CPC .......... *A22B 5/0029* (2013.01); *A22B 5/0041* (2013.01); *A22B 5/0047* (2013.01);
(Continued)

(58) Field of Classification Search
CPC ......... A22B 5/00; A22B 5/0029; A22B 5/165; A22B 5/0041; A22B 5/0047; A22C 17/0086
(Continued)

(56) References Cited

U.S. PATENT DOCUMENTS 3,269,010 A * 8/1966 Bettcher ............... B26B 25/002
                                                     30/276
3,605,841 A    9/1971 Lindstrom et al.
(Continued)

FOREIGN PATENT DOCUMENTS

EP    1 125 500 A2   8/2001
EP    1 236 401 A1   9/2002
(Continued)

*Primary Examiner* — Richard T Price, Jr.
(74) *Attorney, Agent, or Firm* — Holland & Hart LLP (57) ABSTRACT

The invention relates to a tool for manual or especially automatic removal of tenderloins from half-carcasses of slaughtered animals. The tool comprises a circular knife blade, a blade housing supporting the knife blade, and a movable knife blade protector. The tool is connected to a motor capable of driving the knife blade. A tenderloin is partly cut free with the knife, the knife blade protector is activated to protect the knife blade and the tool is used to pull the tenderloin free from the half-carcass without damaging the tenderloin with the knife. The tool can be arranged on a robot and can be used for automatic removal of tenderloins from half-carcasses at slaughterhouses.

17 Claims, 6 Drawing Sheets

(51) Int. Cl.
  *B26B 25/00* (2006.01)
  *A22C 17/00* (2006.01)
(52) U.S. Cl.
  CPC .......... *A22B 5/165* (2013.01); *A22C 17/0086* (2013.01); *B26B 25/002* (2013.01)
(58) Field of Classification Search
  USPC .......... 452/125, 132–134, 149; 30/282, 276, 30/286, 293
  See application file for complete search history.

(56) References Cited

U.S. PATENT DOCUMENTS

| | | | | |
|---|---|---|---|---|
| 4,236,531 A | * | 12/1980 | McCullough | A22B 5/165 30/276 |
| 4,363,170 A | * | 12/1982 | McCullough | B26B 25/002 30/276 |
| 4,439,924 A | * | 4/1984 | Bettcher | B26B 25/002 30/276 |
| 4,575,938 A | * | 3/1986 | McCullough | B26B 25/002 30/276 |
| 4,854,046 A | * | 8/1989 | Decker | B26B 25/002 30/264 |
| 5,234,371 A | | 8/1993 | Andre et al. | |
| 5,311,664 A | | 5/1994 | Abdul | |
| 5,664,332 A | | 9/1997 | Whited et al. | |
| 5,692,307 A | * | 12/1997 | Whited | B26B 25/002 30/276 |
| 5,940,972 A | * | 8/1999 | Baris | B26B 25/002 30/276 |
| 6,604,288 B2 | * | 8/2003 | Whited | B26B 25/002 30/276 |
| 6,615,494 B2 | * | 9/2003 | Long | A22B 5/165 30/138 |
| 6,694,649 B2 | * | 2/2004 | Whited | A22B 5/0064 30/276 |
| 6,751,872 B1 | * | 6/2004 | Whited | B26B 25/002 30/276 |
| 6,938,348 B2 | * | 9/2005 | Roncaglia | B26B 25/002 30/276 |
| 7,000,325 B2 | * | 2/2006 | Whited | B26B 25/002 30/276 |
| 7,285,040 B2 | | 10/2007 | Ilch et al. | |
| 8,037,611 B2 | * | 10/2011 | Levsen | A22B 5/165 30/276 |
| 8,893,391 B2 | * | 11/2014 | Levsen | A22C 17/12 30/276 |
| 2002/0157265 A1 | | 10/2002 | Haneda et al. | |
| 2013/0219726 A1 | | 8/2013 | Rosu et al. | |

FOREIGN PATENT DOCUMENTS

| | | |
|---|---|---|
| EP | 1 937 077 | 7/2008 |
| EP | 1 937 077 B1 | 11/2011 |
| WO | WO 2006/029854 A1 | 3/2006 |
| WO | WO 2007/028386 A1 | 3/2007 |

* cited by examiner

TOOL FOR REMOVAL OF MEAT PIECES SUCH AS TENDERLOIN FROM A CARCASS

FIELD OF INVENTION

The invention relates to a tool for manual or automatic removal of meat pieces such as tenderloins from e.g. half-carcasses of animals. The tool comprises a round or circular knife blade and a housing optionally further comprising a cover strengthening the tool to make it capable of being steered by a robot while cutting in meat. The tool may be connected to a motor capable of driving the knife blade. The tool can be arranged on a robot and can be used for automatic removal of meat pieces such as tenderloins from half-carcasses.

BACKGROUND OF INVENTION

At slaughterhouses tenderloins are normally removed from half-carcasses by partly cutting free the tenderloin with a hand-held butcher knife or a circular knife with a spinning blade and afterwards grapping the tenderloin with a hand and pulling it away from the half-carcass. During this process an abattoir worker position a handheld power-operated rotary knife in the area of the head of the tenderloin, cut free a part of the tenderloin and removes the rotary knife by moving it back along the part of the tenderloin which has just been cut free. With the free hand the tenderloin is pulled free. This is a process putting a high stress on the butchers due to continuously doing the same movements and using forces to pull free the tenderloins.

Power-operated rotary knives are used for different purposes at abattoirs and other food processing facilities. These knives usually comprise a handle and a blade housing which supports an annular knife blade. The knife blade is driven about its central axis relatively to the blade housing by a motor via a gear train. These knives are not strong enough for a tool for automatic removal of meat pieces fush as tenderloins.

U.S. Pat. No. 5,664,332 (Bettcher Industries) describes a power-operated hand held slicing knife with a handle assembly, a ring-like blade housing, a ring-formed knife blade, a blade drive transmission, a depth gauge member and a material directing cover. The knife blade is constructed such that it projects radially inwardly. Such a hand knife is for trimming meat by slicing away layers of e.g. fat with a thickness determined by the depth gauge member. Such slicing knifes are not suitable for removing entire meat pieces such as tenderloins as the cover encircles the upper part of the knife which together with the depth gauge member prevent larger meat pieces to be cut away, furthermore the inwardly projecting knife blade is not suitable to cut out larger meat pieces.

EP1937077 (Teknologisk Institut) describes an apparatus and a method for cutting free at least a part of a tenderloin in a suspended half-carcass. The apparatus comprises a cutting device having a sharp edge curving transversely to the edge, and a moving device for the cutting device for moving the cutting device with the sharp edge foremost during cutting free of at least a part of the tenderloin in a half-carcass. This cutting device is not as easy to steer as required for removing tenderloins.

U.S. Pat. No. 7,285,040 (Maja Maschinenfabrik Hermann Schill) describes a device and an method for de-rinding or trimming a piece of meat, where the device includes an industrial robot with a manipulator arm, a sensor system which detects the part that is to be separated from the meat piece and a cutting tool which separates the detected part from the meat piece. The cutting tool is a knife with a circular rotating blade with a cutting depth setting. The parts of the meat piece to be removed are remnants of meat or fat which remain on the surface during the mechanical de-rinding. The manipulator arm equipped with a trimmer moves along the surface and separates identified remnants from the meat piece. This system is for removing remnants of meat or fat and is not suitable to remove meat pieces such as tenderloins, as the process is different in that when removing remnants this need not be done by taking care of both the removed part and the underlying meat, whereas when removing tenderloins it is important to obtain as entire a meat piece as possible as deviation from the standard reduces the quality and therefore the price of the product.

A more flexible and still strong meat piece removing tool and system is invented and described herein. The meat piece removing tool may be used as a hand-held device or in an automatic process.

SUMMARY OF INVENTION

The invention relates to a meat piece removing tool comprising
  a circular knife blade with a cutting edge,
  a circular blade housing such as a strengthened blade housing and
  a movable knife blade protector capable of moving between a position where the cutting edge of the circular knife blade is uncovered or exposed and a position where the cutting edge of the circular knife blade is covered or protected.

The invention may also be looked upon as a meat piece removing tool comprising
  a round or circular knife blade with a cutting edge,
  a round or circular blade housing supporting the round or circular knife blade,
  a round or circular cover, and
  a movable knife blade protector.

The tool may further comprise a motor capable of driving the knife blade.

The meat piece removing tool is suitable to remove a meat piece from a slaughtered animal such as from a half-carcass or part of a half-carcass. The meat piece removing tool is preferably suitable to cut free or remove a tenderloin or part of a tenderloin.

The meat piece removing tool may be handled manually or automatically by a robot. When the tool is connected to a robot tenderloins can be removed automatically or semi-automatically from e.g. half-carcasses.

A knife blade protector can protect the knife blade and hereby the meat piece removing tool can be used to pull a meat piece such as a tenderloin without damaging the meat piece by the sharp knife blade. The invention also relates to a method for removing a meat piece from an animal carcass, the method comprises the steps of:

Providing an animal carcass wherein the meat piece to be removed is partly exposed,
  Providing a robot with the meat piece removing tool,
  Providing a vision system capable of obtaining and analyzing images of at least a part of the animal carcass,
  The vision system obtains at least one image of at least a part of the animal carcass and performs an image analysis recognizing a predetermined point of reference of the animal carcass,
  The robot is controlled by input from the vision system and the robot steers the meat piece removing tool to cut free at least part of the meat piece of the animal carcass by starting cutting at a pre-calculated distance from the pre-determined point of reference, and Hereby obtaining a meat piece removed from the carcass.

The meat piece may be removed from the carcass by the robot.

When a robot removes a meat piece this may be with the knife blade protector switched to a protecting position hiding the knife blade after a part of the meat piece has been cut free, and then the meat piece removing tool is used to pull the remaining part of the meat piece from the carcass.

The method may be used to cut free a tenderloin where the round or circular knife cuts free the tenderloin by cutting from a starting position in the ham of a half carcass or in the head of the tenderloin and the round or circular knife blade cuts until substantially the entire head of the tenderloin is released, and then with the knife blade protector in a protecting position the tenderloin is pulled from the carcass.

The starting position for the knife to start cutting in a carcass can be determined according to a pre-determined point of reference. To cut free a tenderloin the pre-determined point of reference may be the aitch bone.

DETAILED DESCRIPTION OF THE INVENTION

A first aspect of the invention relates to a meat piece removing tool, where the tool comprises A round or circular knife blade (2) with a cutting edge,
A round or circular blade housing (3) such as a strengthened blade housing (17) and A movable knife blade protector (5) capable of moving between a position where the cutting edge of the circular knife blade is uncovered or exposed and a position where the cutting edge of the circular knife blade is covered.

The strengthened round or circular blade housing may be constructed as two elements, such as a blade housing and a cover and then the invention relates to a meat piece removing tool, where the tool comprises A round or circular knife blade with a cutting edge,
A round or circular blade housing supporting the round or circular knife blade,
A round or circular cover, and
A movable knife blade protector.

The round or circular knife blade can also be and preferable is a rotary knife, a circular knife blade or circular spinning blade. The term 'round' when used to describe the knife blade, the blade housing and the cover should herein be understood as circular or annular. The round or circular knife blade is therefore not a disk-shaped rotating blade.

The round or circular knife blade, the round or circular blade housing and the round or circular cover are all disposed about a central axis extending through the open parts of the mentioned parts of the tool. No parts of the meat piece removing tool will interrupt this central axis. Thus the tool as described herein with the knife blade, the blade housing, the cover and the knife blade protector are all constructed such that a meat piece to be removed by the round or circular knife can enter through the circulating knife without being stopped in a through-going direction by any part of the tool.

The round or circular knife blade is supported by the round or circular blade housing and the cover is located next to the blade housing opposite of the knife blade i.e. if the knife blade is beneath the blade housing then the cover is above the blade housing. The round or circular knife blade may instead be supported by a strengthened knife blade housing and without an independent cover, as the strengthened knife blade housing is a unit constructed to constitute the round or circular blade housing and the cover. The movable knife blade protector is located outside of an assembly of the knife blade, blade housing and cover or outside the knife blade and strengthened knife blade housing.

Preferably the knife blade, the blade housing, the cover and the movable knife blade protector are made of a hard and cleaning friendly material, preferred is metal, such as steel. Most preferred is stainless steel or steel covered with a layer avoiding corrosion.

The round or circular knife blade comprises a cutting part along a circular edge and a circular gear part located along the opposite circular edge, where the gear receives power to spin the knife blade. The round or circular knife blade may be capable of moving in both directions within the blade housing. A knife blade running direction determining means may be connected to the tool making it possible to determine the running or working direction of the knife.

The cutting part of the knife blade is preferably straight or outwardly projecting relative to the central axis extending through the open parts of the blade, housing and blade protector. The angle of the cutting part of the knife blade can be determined due to the overall cutting path of the tool. An example is where the tool cuts free a tenderloin from a half-carcass which is hanging, where the knife enters into the meat in the area of the tenderloin head where the tool faces the substantially vertically meat part with a section of the cutting part of the knife blade, cuts into the meat to a depth corresponding to the thickness of the tenderloin and then when the upper part of the tenderloin head is cut free the tool is turned such that the knife blade is cutting downwardly in the meat, hereby releasing the tenderloin. Such a substantially 90 degree turning in the cutting and the requirements of overall straight cuttings is best met with a straight or outwardly projecting knife blade. Preferably the cutting part of the knife blade is projecting slightly outwardly, such as at least 5 degree in relation to the central axis, e.g. at least 10 degree.

The knife blade can be replaced with a new knife blade when worn out. Also the knife blade can be replaced with another knife blade when the knife blade should be sharpened i.e. according to edge life. Furthermore the replacement may be performed to minimize the risk of growth of micro-organisms and cross-contamination of micro-organisms. Replacement of knife blade may be performed frequently determined on elapsed time from the latest replacement such as about 1 hour, e.g. about 2 hours, such as about 3 hours, e.g. about 4 hours, e.g. about 6 hours, such as about 7 hours, e.g. about 8 hours, such as about 9 hours, e.g. about 10 hours, such as about 11 hours, e.g. about 12 hours. Preferably the knife blade is replaced about each 1 hour when cutting free tenderloins at a speed of at least 200 tenderloins per hour, such as at least 300, e.g at least 400, such as at least 500, e.g at least 600, such as at least 700 tenderloins per hour.

The time to a replacement of the knife blade may also be determined due to the number of cuts performed and in this estimation the risk of cutting into bones may be included. When cutting free tenderloins the knife blade may be replaced for about each 500 tenderloins e.g. for about each 1000 tenderloins, such as for about each 2000 tenderloins, e.g. for about each 3000 tenderloins, such as for about each 4000 tenderloins, e.g. for about each 5000 tenderloins, such as for about each 6000 tenderloins, e.g. for about each 7000 tenderloins, such as for about each 8000 tenderloins.

Fast and simple replacement of a unit including the knife blade is described elsewhere herein. The knife blade may also be sharpened when being located in the tool.

The round or circular cover may have a thickness of 3-5 mm, such as 3.5-4.5 mm. Preferred is a thickness of about 4 mm.

The round or circular cover or strengthened housing may have a height of 6-15 mm, such as 8-12 mm, e.g. 9-11 mm. Preferred is a height of about 10 mm. The height may be increased, however, the movement of the meat piece removing tool is easier when the cover is low and e.g. about 10 mm high.

The round or circular cover or strengthened housing may in a region have an increased height. The height in this region may be 2-15 mm larger than outside of this region. The height in the region with increased height may be 15-25 mm, such as 17-23 mm, e.g. 19-21 mm. Preferred is about 20 mm.

The region with increased height of the cover or housing may correspond to a region where an assembly of the knife blade, blade housing, cover and optionally also the knife blade protector or where the knife blade and strengthened blade housing and blade protector are connected to the remaining part of the meat piece removing tool. This area may also be outside of but close to the area of the connection to the remaining part of the meat piece removing tool or to a cone such as a cone of a replacement unit. The region with the increased height strengthen the cover or the housing make the tool capable of withstanding the forces applied to it during the cutting process.

The round or circular cover or strengthened housing may be split in the area where it is connected to the remaining part of the meat piece removing tool or to a cone such as a cone of a replacement unit. The round or circular cover or strengthened housing may be constructed with a thin split or a larger split, such that when in function the two end parts of the round or circular cover or strengthened housing may be pressed together and touch each other or may be pressed towards each other but room for the gear part of a pinion may be located between the two end parts.

An inner diameter of the cover or the strengthened housing corresponds to the diameter of the knife blade as mentioned elsewhere herein. Preferred is an inner diameter of 68-72 mm.

The cover or the strengthened housing of the meat piece removing tool increases the strength of the tool making it possible to mount the tool on a robot and having the robot to cut out meat pieces from a slaughtered animal. Without the cover the tool may not be strong enough to withstand the forces directed towards the knife assembly when cutting into a slaughtered animal and especially when cutting into bones. Cutting into bones is not arranged when determining the movement pattern of the round or circular knife, but due to biological variation of animals, cutting into bones may be expected for some carcasses. The cover increases the strength of the meat piece removing tool making it possible to mount it on an industrial robot with a payload of 5-30 kg, such as 6-25 kg, e.g. 10-20 kg, e.g. 12-18 kg, and being capable of withstanding the pressure towards the tool when cutting in a carcass. The strengthened housing may obtain a similar strength as a housing and a round or circular cover The round or circular cover or strengthened housing may cover a gear located in the area where the cover or strengthened housing is connected to the cone. The round or circular cover further has the function of strengthen the tool when compared to hand-held circular knives used for removal of tenderloins. This strengthening is required as the load applied in an automatic process usually is higher than when a similar process is performed manually. Thus prior art hand-held knives for removing tenderloins and which is mounted in a robot will not be capable to withstand the downward pressure when a robot is used to remove tenderloins as the housing of such hand-held circular knives is too fragile or not strong enough.

The cover of the meat piece is not a cap or lid and does not cover the area above the round or circular knife. The meat pieces cut with the tool described herein can enter through the round or circular knife without being stopped by a cover.

The tool does not have any depth gauge located inside the circumference made up by the knife blade.

The movable knife blade protector can move between a protecting position where the knife blade protector can protect or hide the round or circular knife blade hindering the round or circular knife blade from cutting, to a non-protecting position where the round or circular knife blade is exposed and capable of cutting.

A knife blade protector activator and/or deactivator in the form of a knife blade protector controlling means or actuator may be an integrated part of the meat piece removing tool or be controlled by a computer e.g. connected to a vision system. Hereby the activator/deactivator can be activated manually or automatically.

The knife blade protector may be used only for protecting/hiding the cutting knife blade when the knife is not in use. Preferably the knife blade protector is activated i.e. protects/hides the knife blade when a part of a meat piece has been cut free, hereby the knife blade protector protects the knife blade and the meat piece removing tool can be used to drag the meat piece from the half-carcass. When the activator is activated automatically actuating the movement of the knife blade protector from a non-protecting position to a protecting position this may be performed at a certain time from the beginning of a cutting process removing a meat piece, where the beginning can be calculated from the time the knife blade is in contact with the meat. The knife blade protector should be deactivated to a non-protecting position before the knife blade gets into contact with the meat, and can be activated to a protecting position at any time e.g. at a pre-determined time during the cutting through the meat or when the cutting through the meat has been finished. Automatic activation of the activator/deactivator may also be due to input from a vision system such that the knife blade cuts to a predetermined point of the meat piece to be cut free before the knife blade protector is moved to a protecting position.

The gears driving the knife blade may be a spur gear or preferably a bevel gear such as straight bevel gears or spiral bevel gears. The bevel gears create a larger tooth surface of the gears than spur gears and hereby a greater intermeshing area between the two gears. The driving gear of the knife blade is spun due to power transmission from a pinion receiving power from a motor such as a pneumatic motor.

The knife blade may be replaced in different ways. 1. Only the knife blade is replaced or 2. A replacement unit comprising the knife blade, the blade housing and a cone is replaced.

The strengthened blade housing may comprise connecting parts connecting the blade housing to a cone or frame assembly. The strengthened blade housing may be connected in a fixed way to the cone in one side of the cone such that the connecting part is firmly secured to the cone. At the other side of the cone the connecting part of the strengthened blade housing may be connected to an activator which may determine when the connecting part should be forced towards the cone and when the connecting part should not be forced towards the cone. The cone may comprise connecting grooves matching the form and size of connecting parts of the strengthened blade housing. The activator may be power-driven such as by e.g. compressed air or an electro-magnet. When the knife blade should be changed the activator releases the pressure forcing the connecting part of the strengthened blade housing towards the cone and hereby the released connecting part move outwardly and the knife blade can be removed from the strengthened knife blade housing and be replaced with another knife blade which can be hold in position by a recess in the knife blade housing.

An aspect of the invention relates to a replacement unit for tools to be attached to a handle or to a robot arm, such as a replacement unit for a circular or round or circular knife. The replacement unit may comprise the executive instrument performing a work when the tool is in function and a cone. Such a replacement unit may comprise a round or circular knife blade, a knife blade housing, a cone to which the knife blade housing is connected and a gear capable of interacting with a gear on the round or circular knife blade. The cone of the replacement unit may comprise a gear in the part facing the executive instrument, a central opening suitable for a power transmission shaft such as a pinion transmitting power from a motor to the executive instrument, an element for connecting the replacement unit to a handle or a robot arm, such as a coupling e.g. a quick-acting coupling It should be understood that further elements may be located between the replacement unit and the handle or robot arm when the replacement unit is connected to the handle or robot arm.

The cone of the replacement unit may be secured to a handle or robot arm by e.g. at least one securing element such as a pin stretching through part of the coupling part of the replacement unit and a part of the handle, robot arm or any further element located between the replacement unit and the handle or robot arm. Such a securing element may be removed manually or automatically before the replacement unit is removed and the securing element may be replaced manually or automatically after another replacement unit is connected to the quick-acting coupling.

Preferably the meat piece removing tool as described herein is a tenderloin removing tool and can be used to partly cut free a tenderloin and then pulling the tenderloin away from e.g. a half-carcass. Preferably the tenderloin head is cut free with the tenderloin removing tool and the rest of the tenderloin is pulled from the half-carcass by the use of the tool. The amount of the tenderloin which is cut by the meat piece removing tool is preferably similar to the amount of the tenderloin cut free by an abattoir worker when tenderloins are removed by a manual process using a circular knife. When the tenderloin removing tool with the knife blade protector in a non-protecting position is used for the pulling part of the process the knife blade protector should preferably be in a position protecting the knife blade. Hereby the tenderloin can be protected from cutting damages caused by the sharp knife blade. Cutting damages in the meat pieces may occur even if the knife blade is not running and the tool is used for pulling the tenderloin from the half-carcass, but cutting damages in meat piece can be avoided when protecting the knife blade with the knife blade protector while pulling the tenderloin from the half-carcass. Tenderloins and also other types of meat pieces may have an increased value when not possessing cutting damages.

When it is described herein that a tenderloin is partly or fully cut free using the tool described herein, it should be understood that tenderloin can be with the tenderloin head or without the tenderloin head (loin fillet) or it can be a piece of the tenderloin (e.g. oyster piece loin). The tenderloin can also be with or without the chain fillet. A tenderloin removed from a pig, lamb or other animal by the use of the meat piece removing tool described herein may include the entire tenderloin, the chain fillet, the membranes around the tenderloin, a small part of ham meat (preferably less than 50 gram) and a small part of groin meat (preferably less than 40 gram). However, a tenderloin removed from a pig, lamb or other animal by the use of the meat piece removing tool described herein may also include part of or the entire tenderloin with some or all of the membranes around the tenderloin, and optionally a small part of ham meat (preferably less than 50 gram) and/or a small part of groin meat (preferably less than 40 gram).

When removing a tenderloin from a half-carcass, the cutting time for cutting free the head of the tenderloin can be less than 1 second, such as about 0.75 second, such as about 0.5 second. If the tool is used for pulling the meat piece, the knife blade protector is moved to a protecting position when the cutting time is ended, at this time the position of the tool may be within the meat and the tool can be used to pull the meat piece such as pulling the tenderloin from a half-carcass.

With the motor positioned on the meat piece removing tool no wire transferring the power from a motor positioned away from the meat piece removing tool to the knife is needed and thus no wire is twisted when the round or circular knife is working hereby avoiding interruption due to damaged wires.

The motor included in the tool increases the strength of the tool making it possible for the round or circular knife blade to cut very close to bones or even cut into bones. The location of the motor close to the knife blade also makes it possible to increase the rotation speed of the round or circular knife.

The motor may be located anywhere at the meat piece removing tool, preferably the motor is located such that when the meat piece removing tool is working the motor does not touch the animal tissue. The motor may be located at the right side or left side of the tool in respect of the round or circular knife and seen from the 'view' of a robot or robot arm steering the tool, however, the motor may also be located above or beneath the round or circular knife of the tool, although without hindering the tool working close to the animal tissue.

In an embodiment the tool may further comprise connecting means for connecting the tool to a robot. The robot can steer the meat piece removing tool to cut free a desired meat piece e.g. a tenderloin from a half-carcass. However, the meat piece removing tool may also be manually handled e.g. by a butcher. Preferably the meat piece removing tool is steered by a robot.

In another embodiment the tool further comprises spring means allowing the tool to be adaptive or resilient such that the tool can budge or flex in a sideway direction when the knife is meeting increased resistance from the carcass e.g. by cutting in a bone. A resistance threshold can be established hereby determining if the knife blade should or should not cut into animal material having a higher resistance than meat, membranes and tendons. When the threshold resistance is met the meat piece removing tool may budge away sideways and cut along the material having the increased resistance, hereby the knife blade may cut along a bone and cut off all the meat from the bone and leaving a white bone in the carcass when the meat piece is removed.

The adaptive or resilient sideway displacement of the meat piece removing tool may be between 1 and 20 mm measured as the distance the knife budge or flex in a sideway direction. Preferably the adaptive or resilient side way displacement of the tool can be 5-15 mm, such as less than 10 mm e.g. less than 15 mm. A sideway displacement may be performed stepwise in steps of between e.g. 1-15 mm, such as 2-10 mm, e.g. 2-5 mm.

The sideway displacement may be automatic activated when the knife is subjected to a strong resistance such as the resistance from a bone. By the displacement of the knife less cutting in bones is obtained prolonging the lifespan of the knife blade and improving the quality of the meat piece removed, as less unwanted material is located on the meat piece.

When cutting free a tenderloin from a half-carcass the adaptive or resilient sideway movement of the meat piece removing tool is usually activated which is due to the knife's pressure towards the aitch bone which the knife preferably should work along resulting in a pressure from the knife towards the aitch bone and a counter pressure from the aitch bone to the knife such that the knife blade cuts along the aitch bone.

In an embodiment of the tool, the knife blade protector is round or circular and is located at the outside of the round or circular knife. The knife blade protector can be located as close to the knife blade as possible e.g. with a distance less than 2 mm, such as less than 1.5 mm e.g. about 1 mm between the knife blade and the knife blade protector when the knife blade protector is in a position protecting the knife blade. The main activity of the knife blade protector may be to protect a meat piece when this meat piece is pulled from the animal carcass using the meat piece removing tool to pull, and thus avoiding cutting damages in the meat.

In another embodiment the tool may further comprise a knife blade protector moving means, where this knife blade protector moving means is connected to the knife blade protector and capable of moving the knife blade protector from a protecting position where the knife blade protector protrudes over the cutting edge of the knife blade to a non-protecting position where the knife blade protector is retracted and the cutting edge of the knife blade is exposed. When in a protecting position the knife blade protector may protrude e.g. 1-10 mm from the cutting edge of the knife blade. When in a non-protecting position the knife blade may protrude e.g. 1-10 mm from the edge of the knife blade protector. Preferably when in a protecting position the knife blade protector protrudes 4-10 mm from the edge of the cutting knife blade and when in a non-protecting position the knife blade protrudes 6-10 mm from the edge of the knife blade protector.

The meat piece removing tool may further comprise an actuator connected to the knife blade protector moving mean. An actuator can actuate the knife blade protector moving means. An actuator can be a spring or a cylinder such as a pneumatic cylinder.

In a further embodiment the round or circular knife blade of the tool may have a diameter of between 20 and 90 mm. The diameter can be determined depending on the type/size of animal and/or the type/size of meat piece to cut with the tool. If the tool is used for removal of tenderloin from lambs the diameter of the knife blade may be about 25 mm, whereas for removal of tenderloin from pigs the diameter of the knife blade may be about 68 mm for pigs at a slaughter weight of about 85 kg. Preferred is a knife blade diameter of 60-70 mm, more preferred is 64-72 mm corresponding to the diameter of pork tenderloin from pigs with a slaughter weight of 60-110 kg.

The round or circular knife of the tool as described herein may be capable of working at a rotation speed of between 400-1000 rounds per minute, such as 600-1000 rounds per minute. The high rotation speed may secure an even cut of the meat and the possibility of a short cutting time when the knife works through the meat and/or the surrounding tendons, membranes, bones etc. The high working speed i.e. many rounds per minute of the round or circular knife blade may also secures that the meat piece removing tool when cutting in meat is not pressing on the meat but actually is cutting through the meat.

An aspect of the invention relates to a method for removing a piece of meat piece such as a tenderloin from an animal carcass, an animal half-carcass or from a part of an animal carcass, the method comprise the steps of    a. Providing an animal carcass, an animal half-carcass or a part of an animal carcass, wherein the meat piece to be removed e.g. the tenderloin is partly exposed,    b. Providing a meat piece removing tool as described herein or a robot with the meat piece removing tool as described herein,    c. Providing a vision system capable of obtaining and analyzing images of at least part of the animal carcass,    d. The vision system obtains at least one image of at least a part of the animal carcass and perform an image analysis recognizing at least one predetermined point of reference of the animal carcass, e. The robot is controlled by input from the vision system and the robot steers the meat piece removing tool to cut free at least part of the meat piece e.g. the tenderloin of the animal carcass by starting the cutting with the round or circular knife blade at a pre-calculated distance and pre-determined direction from the pre-determined point of reference,
f. Hereby obtaining a piece of meat such as a tenderloin cut free and removed from the carcass.

In the method described above the tool may be used following step e) such that the robot removes the meat piece e.g. the tenderloin from the animal carcass. This removal may be by pulling the meat piece with the tool with the knife blade protector in a protecting position.

A vision system capable of obtaining and analyzing images of at least part of an animal carcass may comprise at least one camera, a database and at least one computer or processer and connection means connecting these parts as well as connecting the vision system to the robot. A least one camera can be used to obtain at least one image of an area of an animal, the image including at least the starting point for the cutting process and optionally a predetermined point of reference if such one is used for determining the starting point. The at least one camera can be placed in any suitable location making it possible to obtain images of a carcass area from where the meat piece (e.g. tenderloin) should be removed. At least two cameras are preferred in systems where the two half-carcasses of an animal is treated simultaneously or just after each other, hereby each of the two cameras is for obtaining at least one image of each half-carcass and thus making it possible to obtain images from each half-carcass as soon as these are in the correct position for cutting free a meat piece.

The method using the meat piece removing tool as described herein may be semi-automatic in that a method for removing a piece of meat piece such as a tenderloin from an animal carcass, an animal half-carcass or from a part of an animal carcass, may comprise the steps of a. Providing an animal carcass, an animal half-carcass or a part of an animal carcass, wherein the meat piece to be removed e.g. the tenderloin is partly exposed,
b. Providing a robot with the meat piece removing tool as described herein,
c. Providing a vision system capable of obtaining and analyzing images of at least part of the animal carcass,
d. The vision system obtains at least one image of at least a part of the animal carcass,
e. An operator indicates in an image within the vision system a predetermined point of reference or a starting position for where the round or circular knife blade should start cutting into the meat,
f. The robot is controlled by input from the vision system and the robot steers the meat piece removing tool to cut free at least part of the meat piece e.g. the tenderloin of the animal carcass by starting the cutting with the round or circular knife blade at a pre-calculated distance and pre-determined direction from the pre-determined point of reference if the operator indicates the point of reference or the robot start cutting into the meat at the starting point indicated by the operator,
g. Hereby obtaining a meat piece such as a tenderloin cut free from the carcass.

An operator may also indicate the end position in the image, this end position corresponds to where the round or circular knife blade should stop cutting. The end position may be at a point where the round or circular knife is still located within the carcass i.e. the meat piece is partly cut free or it may be an end position where the knife is used to fully cut free the meat piece.

An operator may also enter data into the system which influences the movement pattern of the knife as described elsewhere herein, such data may relate to animal race, animal type, animal size, animal anatomy, kind of meat piece to cut free and/or the desired size of the meat piece to be removed. Preferably the animal anatomy is automatically determined by the image analyzing system and the movement pattern of the robot/knife is determined by the computer program to direct the knife to the desired starting position and perform the desired movement pattern of the knife.

In the method described above the tool may be used following step f) such that the robot removes the meat piece e.g. the tenderloin from the animal carcass, e.g. by pulling.

The diameter of the knife blade may be determined according to the slaughter weight and the type of animal to be treated as described elsewhere, an operator may decide when to change the knife blade to obtain the correct diameter of the knife e.g. when animals of a different size should be treated. The change of knife blade may be performed manually or the operator may instruct the robot to change the knife to a knife with a knife blade with the correct diameter.

The system may also automatically change the knife on the robot to a knife with a knife blade with the correct diameter, the change of knife may be determined by information in a slaughterhouse system controlling the cutting of the animal, these information may be the animal type and slaughter weight which are used by a computer connected to the robot to determine which knife blade diameter should be used for cutting and removal of a meat piece from a specific slaughtered animal. The computer may then send information to the robot to change the knife to the determined knife blade diameter and the robot may change the knife accordingly before cutting free a meat piece from the slaughtered animal.

The method using the tool as described herein may also be manually where the method can be for removing a meat piece such as a tenderloin from an animal carcass, an animal half-carcass or from a part of an animal carcass, the method comprises the steps of a. Providing an animal carcass, an animal half-carcass or a part of an animal carcass, wherein the meat piece to be removed e.g. the tenderloin is partly exposed,
b. Providing a meat piece removing tool as described herein,
c. Directing the round or circular knife of the tool towards a pre-determined starting point of the animal carcass or part of an animal carcass,
d. Cutting free partly or fully a meat piece,
e. Optionally if only partly cutting free the meat piece, then also pulling free the remaining part of the meat piece, where the pulling may be performed with the tool,
f. Hereby obtaining a meat piece such as a tenderloin cut free from the carcass.

When the meat piece removing tool is used for partly pulling free a meat piece, the movable knife blade protector is preferably in a protecting position protecting the round or circular knife blade and avoiding cutting with the round or circular knife.

The method may also be performed at an abattoir for removing tenderloins from half-carcasses which may still be connected in the head region and which half-carcasses may be hanging in the hind legs at a slaughter line and from which carcasses the guts have been removed, the method may comprise the steps of Optionally fixing the two half-carcasses, And for each half-carcass, simultaneously or one by one Obtaining at least one image of the area around and including at least the head of the tenderloin, Analysing the at least one image by recognizing a pre-determined point of reference and determining the location of a starting point for the cutting process, Automatically transferring information from the analysis to a robot steering the meat piece removing tool, Directing the round or circular knife of the meat piece removing tool and with the knife blade protector in a non-protection position to the starting point determined in the half-carcass, Cutting free at least the tenderloin head, With the round or circular knife located around the tenderloin, automatically activating the movable knife blade protector to move the knife blade protector from a non-protecting position to a protecting position, Pulling the remaining part of the tenderloin free from the half-carcass with the meat piece removing tool having the knife blade protector in a protecting position, Hereby obtaining a tenderloin removed from each of the carcasses.

In short the method can be for removing a tenderloin from a half-carcass at a slaughter line in an abattoir, where the method comprises the steps of managing the meat piece removing tool as described elsewhere herein such that the knife blade of the meat piece removing tool cuts free at least a part of the tenderloin of the half-carcass and then removing the tenderloin from the half carcass.

The tool as described herein may also be used for half-carcasses lying with the inside accessible to the tool hereby being able to remove the tenderloin of the half-carcass. Preferably the inside of the half-carcass is facing upward. Half-carcasses may be lying on a conveyor belt which may stop while a tenderloin is removed from a half-carcass. The conveyor belt may also continue running while tenderloins are removed from half-carcasses by a system for removing tenderloins including the meat piece removing tool as described herein, and where at least part of the system for removing tenderloins follow the moving conveyor belt during the operation of removing a tenderloin.

As described above the knife blade protector is in a retracted or non-protecting position while the knife blade cuts in the carcass.

In an embodiment the knife blade protector after a part of the meat piece is cut free is moved to a protruding or protecting position hiding/protecting the knife.

When the knife blade protector is in the protecting position the meat piece removing tool can be used to pull the meat piece (e.g. tenderloin) free from the carcass.

The tenderloin pulled from the half-carcass may be dropped downwardly onto a conveyor belt or into a box, which can be removed frequently and replaced by an empty box.

When the robot is in function such as by removing tenderloins from half-carcasses, an assembly and/or handling station may be located within the working distance of the robot. The assembly and/or handling station may comprise a number of ready to use replacement units as further described elsewhere herein and/or a number of ready to use knife blades and areas to locate used knife blades and/or used replacement units. Also a number of pins to securing replacement units may be present in the station.

The assembly and/or handling station may also comprise at least one washing area where the tool handled by the robot arm such as the meat piece removing tool may be washed.

Washing may be performed to reduce the number of micro-organisms on the tool. A washing area may comprise e.g. a covered area where water such as hot water e.g. of at least 70° C. and optionally also comprising a detergent can be sprayed onto the tool. A sensor may register when the tool to be washed is located in the washing area and a processor connected to the sensor may operate the water flow by turning the water flow on and off. The water flow may also comprise a first flow of water with a detergent to rinse the tool followed by a second flow of clean water to remove detergent. Washing the tool may be performed frequently such as each 5 min, e.g. each 10 min, such as each 15 min, e.g. each 20 min, such as each 25 min, e.g. each 30 min or longer. The time between the washing steps is preferably equal to or less than the time between replacements of knife blades or replacement units. If the time between washing steps and between replacement are equal, washing is preferably performed half-ways in the time to the next replacement of knife blade or replacement unit.

The assembly and/or handling station may also comprise at least one knife sharpener suitable to put a sharp edge on the round or circular knives. A sensor in the assembly and/or handling station may register when a knife blade is positioned near the knife sharpener and the knife sharpener should be activated. The knife sharpener may run for a predetermined time securing the knife blade obtains a sharp edge. Before or after the knife blade is sharpened, the tool may be washed such as in the washing area of the assembly and/or handling station.

When removing meat pieces with the meat piece removing tool as described herein, the carcass, half-carcass or part of a carcass, or the animal tissue may be pre-treated. A pre-treatment may be a cooling process whereby the meat is cool and obtain a tissue temperature of between 0° C. and 18° C., e.g. between 1° C. and 15° C., such as between 3° C. and 10° C., e.g. between 5° C. and 7° C., such as about 6° C. The temperature may be determined by measuring the temperature within the meat piece which should be removed e.g. within the tenderloin, such as within the tenderloin head. The temperature may also be measured within the ham e.g. measured 5-7 cm inside the ham where a thermometer may be stuck into the ham from the cut side of a half-carcass.

A pre-treatment of a carcass, a half-carcass or a part of a carcass may include freezing the carcass, half-carcass or part of a carcass at a temperature of between −16° C. to −27° C. for 70 to 100 minutes followed by cooling at 1-5° C. for 16-20 hours.

A pre-treatment including cooling and/or freezing of a carcass, half-carcass or part of a carcass before removing a meat piece with the meat piece removing tool as described herein may result in contraction of meat and resulting in more loose membranes within the carcass compared to non-pre-treated carcasses. When pulling a meat piece from the carcass the separation of the meat piece from the rest of the carcass is easier when the membranes are loose.

Another embodiment of the invention relates to the method wherein the round or circular knife cuts free a tenderloin by cutting from a starting position in the ham of the half carcass or in the head of the tenderloin and the knife cuts until substantially the entire head of the tenderloin is released, and then with the knife blade protector in a protecting position the tenderloin is pulled from the carcass.

When pulling a part of the tenderloin from the carcass the release of the tenderloin is performed by pulling membranes around the tenderloin from each other or from the surrounding meat.

In a preferred embodiment of the method the starting position for the round or circular knife is determined according to a pre-determined point of reference.

A point of reference is preferably a point which is recognizable each time a certain piece of meat should be partly or fully removed by the meat piece removing tool as described herein. When removing tenderloins from a half-carcass the point of reference may be the aitch bone.

The point of reference may also be the starting point for the cutting process for cutting free at least partly a meat piece. However the starting position for the knife may also be located at a distance from the per-determined point of reference, such as within 10 cm from a pre-determined point of reference, e.g. within 5 cm from a pre-determined point of reference, such as within 3 cm from a pre-determined point of reference.

Before the method described herein can become an automatic method at an abattoir, the exact movement pattern should be determined where the movement pattern is performed by the robot when moving the meat piece removing tool towards the carcass, cutting free at least partly a meat piece and removing the tool again e.g. by pulling the meat piece free. Determination of an exact movement pattern when removing a meat piece can be based on a bundle of movement patterns stored in a computer, making the system capable of correcting the exact movement pattern depending on the situation i.e. how different factors deviate from an average movement pattern. A movement pattern may be dependent on different factors such as the race of animal, type and size of animal, and which meat piece should be removed together with the size of the meat piece to be removed. The bundle of movement patterns may also be a number of movement patterns usable to determine the correct movement for the robot from a resting position to the starting point for cutting free a piece of meat and the remaining movement pattern to cut free a meat piece may be the same each time a specific meat piece is to be cut free.

The pre-determined movement pattern of the robot can be entered into a vision system including at least one camera, at least one database and at least one computer or processor, such that when a pre-determined point of reference is detected in at least one image obtained by a camera and of the area of a carcass from where a meat piece should be removed, then the exact movement pattern for the robot can be determined by the computer using information from images and movement patterns stored in the database, and information of the exact movement pattern of the robot can be forwarded from the computer to the robot, which then can perform the movement pattern and cut free at least a part of a meat piece.

Before removing a meat piece from a carcass or a part of a carcass with the meat piece removing tool as described herein, the carcass or a part of a carcass may be supported or fixed to make sure the carcass or a part of a carcass is held in a correct position and/or is not moved in an un-controlled manner increasing the risk of incorrect cutting in the carcass.

Supporting or fixing a half-carcass may be by supporting or fixing at the skin side close to the area from where a meat piece is to be removed. A fixture may be used to support or fix a half-carcass. When a tenderloin is to be removed from a half-carcass by the meat piece removing tool as described herein the half-carcass may be fixed before the vision system obtains at least one image of the area including the aitch bone and tenderloin head, optionally the abdominal tissue can be pulled outward to give more room for the meat piece removing tool when working by cutting free a part of the tenderloin. The front leg of a half-carcass may also be pulled outward i.e. away from a line following the spine of the half-carcass before the meat piece removing tool cuts in the meat of the half-carcass.

An aspect of the invention relates to use of the meat piece removing tool as described herein for removing a meat piece from an animal. The meat piece removing tool may comprise any or all of the items described herein.

An animal or part of an animal such as half-carcasses from where a meat piece may be removed using the meat piece removing tool, may be from animals such as farm animals e.g. pigs and sheep. Preferred are pigs and sheep including lambs. Most preferred are pigs and lambs grown to become slaughtered for meat production.

A meat piece to be removed from an animal using the meat piece removing tool as described herein may be any meat piece. Preferred is the use of a tenderloin removing tool for removing a part of or the entire tenderloin from animals, such as from pigs.

Another aspect of the invention relates to a robot with a meat piece removing tool as described herein. The meat piece removing tool may comprise any or all of the items described herein.

A robot used with the meat piece removing tool as described herein can be an industrial robot which is automatically controlled and programmable in three or more axes, and which may be either fixed in place or mobile for use in industrial automation applications.

Preferably the meat piece removing tool as described herein may be used at abattoirs and especially in an automatic process where the meat piece removing tool is steered by a robot.

The meat piece removing tool described herein may be constructed in at least two designs suitable to remove meat pieces from a left and a right part of a carcass. The two designs may be reversed of each other and thus be mirror images of each other. Hereby the reversed tools can be designed to more easily work within a half-carcass without touching the animal tissue except for the connection between the knife and the tissue.

With an automatic system including a meat piece removing tool as described herein at least 700 meat pieces can be removed each hour with a single tool, such as 300-1200 meat pieces per hour e.g. 700-1000 meat pieces per hour. The meat pieces may be tenderloins from pigs.

An automatic system with two meat piece removing tools for removing meat pieces from two half-carcasses of an animal, may hourly remove meat pieces such as tenderloins from at least 700 animals e.g. at least 1000 animals i.e. 2000 meat pieces e.g. tenderloins per hour.

The method may further comprise frequently replacement of the knife blade such as by delivering and receiving a knife blade from an assembly and/or handling station, where the method may comprise the steps of Moving the blade protector upwardly or downwardly according to the axis extending through the open parts of the knife blade, housing and blade protector, Activating the activator such that a connecting part of the strengthened blade housing is not forced towards the cone, hereby the knife blade housing is opened and the knife blade is removable from the housing, Positioning the knife blade in an area for used knife blades or in a washing section of the assembly and/or handling station, Locating a ready-to-use knife blade in the knife blade housing, where the ready-to-use knife blade may be located in the assembly and/or handling station, Activating the activator such that the connecting part of the strengthened blade housing is forced towards the cone, hereby the knife blade housing is pressed towards the knife blade, Repositioning the blade protector around part of the knife blade and/or knife housing.

The method may further comprise frequently replacement of the replacement unit such as by delivering and receiving a replacement unit in an assembly and/or handling station, comprising the steps of Moving the round or circular blade protector upwardly or downwardly according to the axis extending through the open parts of the knife blade, housing and blade protector such that the replacement unit can pass the blade protector when being moved, Loosening the replacement unit such as by removing the securing element e.g. a pin securing the replacement unit to the other part of the tool, Positioning the replacement unit in an area for used replacement units in the assembly and/or handling station, Connecting a ready-to-use replacement unit to the coupling part of the remaining tool part on the robot arm, where the ready-to-use replacement unit may be located in an area of the assembly and/or handling station, Securing the replacement unit such as by placing the securing element in the coupling part, Repositioning the blade protector around part of the knife blade and/or knife housing.

In the replacement of a replacement unit, the moving of the round or circular blade housing upwardly or downwardly and the loosening or removing of the securing element may be done in any order or simultaneously.

The method may further comprising frequently washing of the knife blade, blade housing, the cover and knife blade protector, comprising the steps of Directing the tool to a washing area, Turning on water optionally comprising a detergent and directing water optionally comprising a detergent towards the tool, Turning off water comprising a detergent, Turning on clean water and directing clean water towards the tool, Turning off clean water, Turning on pressured air, directing the pressured air towards the tool to remove water from the tool, Turning off pressured air.

The water comprising a detergent is preferably hot and with a temperature above 70° C. The clean water preferably has a temperature below 40° C. to cool the tool and reduce the risk of protein coagulation on the tool when cutting into meat.

The method may also comprise sharpening the knife blade, comprising the steps of Directing the tool to a knife sharpener of the assembly and/or handling station, Turning on the knife sharpener, Bringing the knife blade to be sharpened into contact with the knife sharpener for a predetermined time, Removing the sharpened knife blade from the knife sharpener, Turning off the knife sharpener.

The knife sharpener is preferably located such that metal removed from the knife blade does not get into contact with meat. An exhaust may be directed towards the knife blade during the sharpening process and/or the sharpening process may be performed in an enclosure of the assembly and/or handling station.

An automatic system may be constructed such that the entire system including at least one robot, at least one meat piece removing tool and optionally at least one camera is capable of moving along and together with the animals moving on a slaughter line while the meat piece such as a tenderloin is removed from an animal using the meat piece removing tool as described herein. Such a system following e.g. pigs on a slaughter line may comprise two robots or two robot arms each with a meat piece removing tool and being capable of simultaneously removing tenderloins from two half-carcasses of e.g. pigs. When the meat piece removing tools of an automatic system have removed the decided meat piece(s) the system may move along the slaughter line in a direction opposite of the moving direction of the slaughtered animal and the system hereby may return to the next carcass or half-carcass from which the decided meat piece (e.g. tenderloin) can be removed.

DETAILED DESCRIPTION OF THE FIGURES

Figure 1:
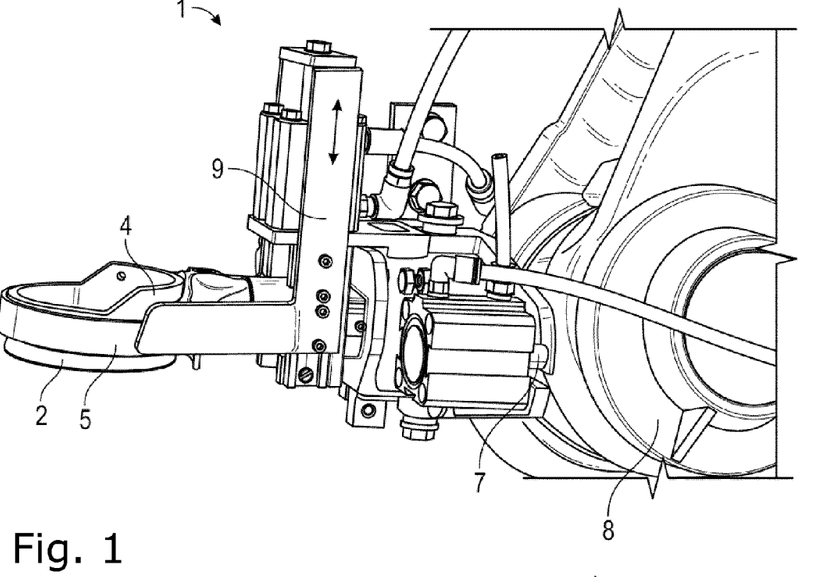
FIG. 1. A meat piece removing tool (1) with a round or circular knife blade (2) with the knife blade protector (5) in the withdrawn or non-protecting position and ready to cut free a meat piece.

FIG. 1. A meat piece removing tool (1) with a round or circular knife blade (2) with the knife blade protector (5) in the withdrawn or non-protecting position and ready to cut free a meat piece. Also shown are the knife blade protector moving means (9) and the spring means (7) which is in front of the location of connecting means for connecting the tool (1) to a robot (8). The tool is ready to be directed towards e.g. a half-carcass of a pig for cutting free at least a part of a meat piece such as a tenderloin.

Figure 2:
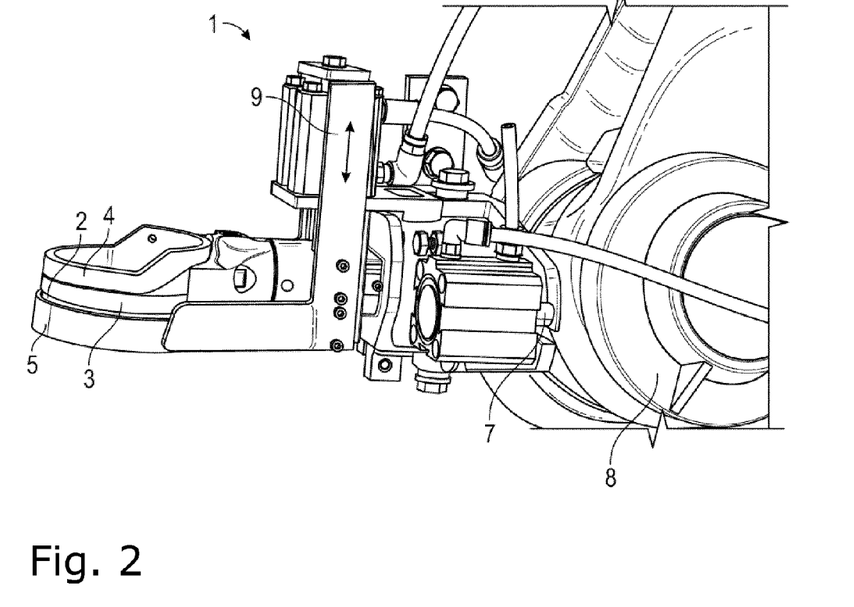
FIG. 2. A meat piece removing tool (1) with a round or circular knife blade (2) with the knife blade protector (5) in the protecting position hindering the knife blade (2) from cutting.

FIG. 2. A meat piece removing tool (1) with a round or circular knife blade (2) with the knife blade protector (5) in the protecting position hindering the knife blade from cutting. Also shown are the knife blade protector moving means (9) and the spring means (7) which is in front of the location of connecting means for connecting the tool (1) to a robot (8). The tool is ready to pull e.g. a tenderloin which is partly cut free from a half-carcass. The knife blade protector protects the tenderloin from cuts made by the knife while pulling the tenderloin from the half-carcass.

Figure 3:
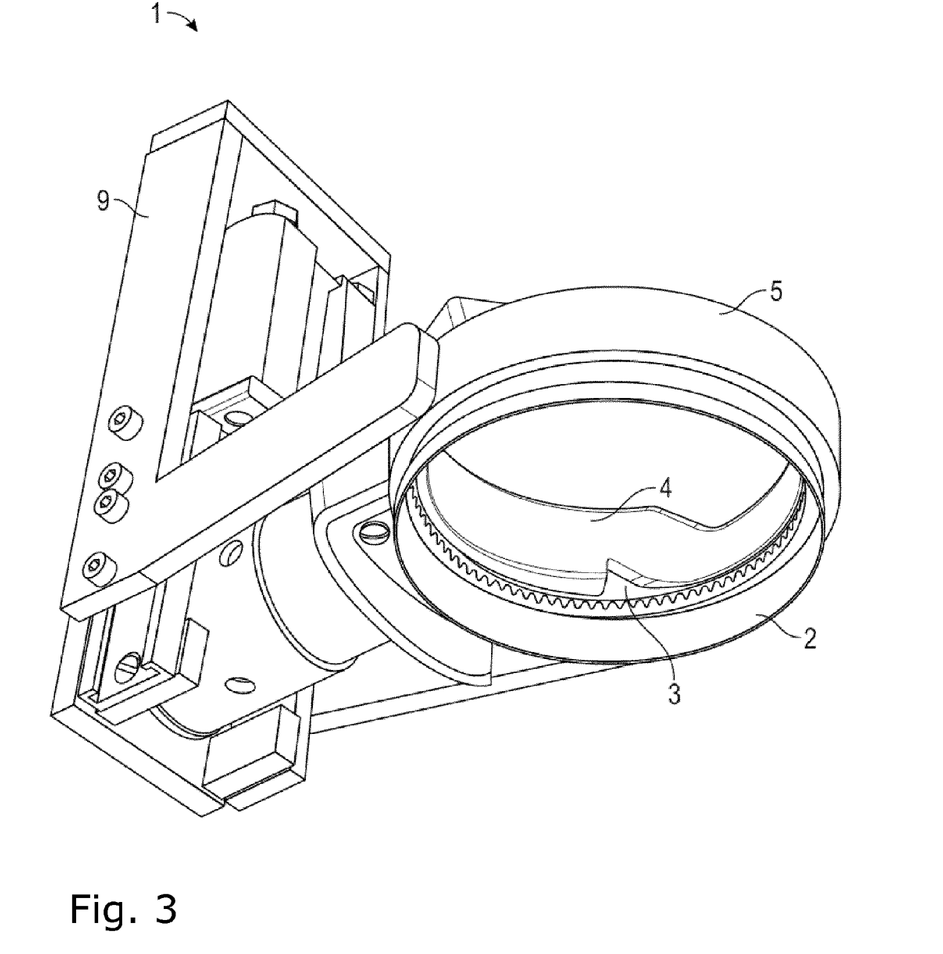
FIG. 3. A meat piece removing tool (1) with a round or circular knife blade (2), a round or circular blade housing (3), a round or circular cover (4) and a knife blade protector (5).

FIG. 3. A meat piece removing tool (1) with a round or circular knife blade (2), a round or circular blade housing (3), a round or circular cover (4) and with the knife blade protector (5) in the non-protecting position. Also shown are the knife blade protector moving means (9). The cover (4) of the meat piece removing tool (1) increases the strength of the tool making it possible to mount the tool on a robot and having the robot to manage the tool to cut out meat pieces from a slaughtered animal.

Figure 4:
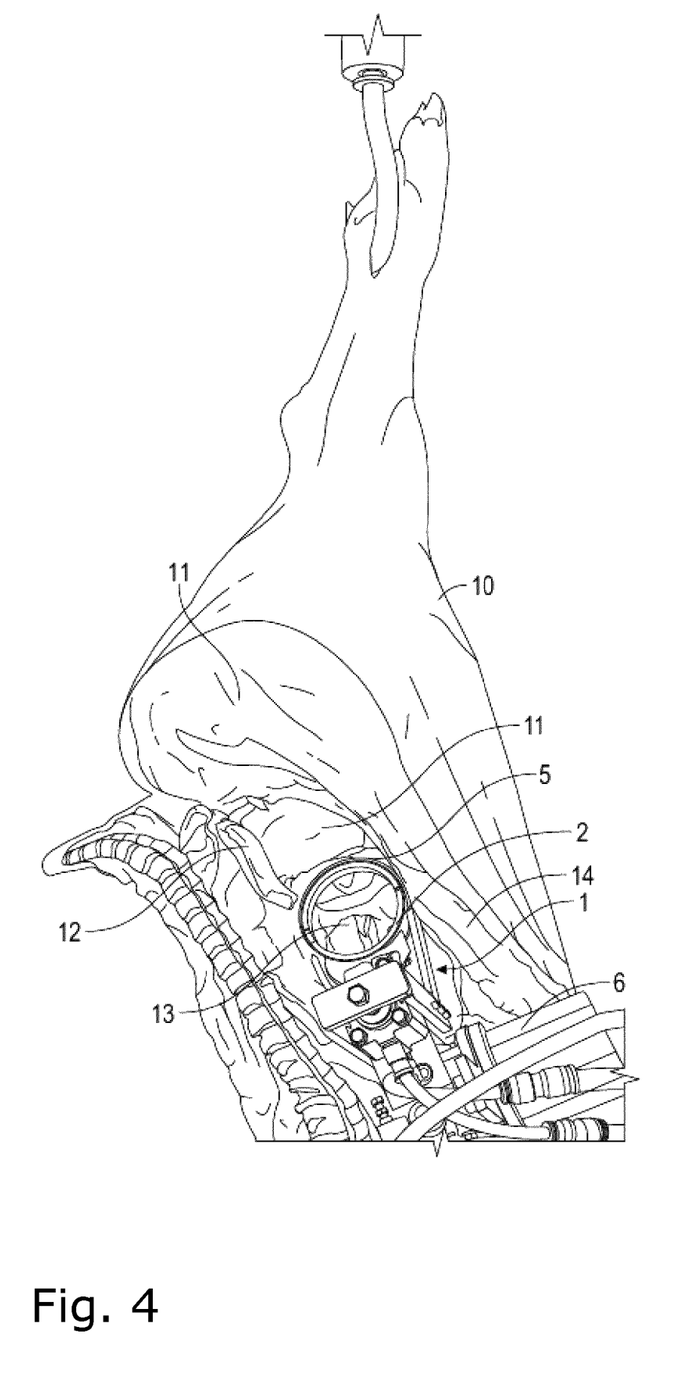
FIG. 4. A hind part (10) of a pig half-carcass and a meat piece removing tool (1) with a round or circular knife blade (2) with a knife blade protector (5), the round or circular knife blade (2) is positioned to start cutting free a tenderloin (13).

FIG. 4. Removal of a tenderloin from a hind part (10) of a pig half-carcass with a meat piece removing tool (1) with a round or circular knife blade (2) and a knife blade protector (5), the round or circular knife blade (2) is positioned to start cutting free the tenderloin head (13). The half-carcass is hanging in the hind leg and supported (not shown) to avoid free moving of the half-carcass. The aitch bone (12) can be the point of reference for a vision system to determine the exact starting point for the round or circular knife blade (2) to partly of fully cut free the tenderloin. The starting point for the cutting process may include a little ham (11) tissue or starts in the tenderloin head (13). The motor (6) of the meat piece removing tool (1) is shown, whereas the robot arm to which the meat piece removing tool may be connected is not shown.

Figure 5:
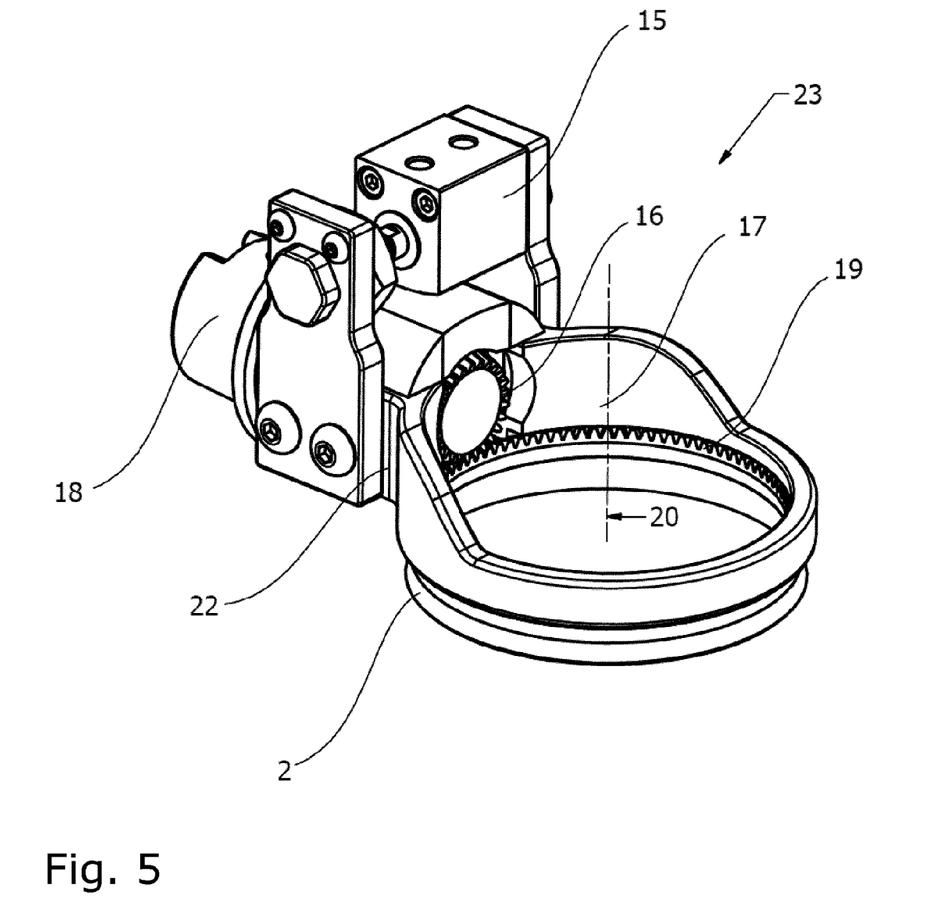
FIG. 5. A replacement unit (23) of the meat piece removing tool, where the replacement unit (23) comprises a cone (21) with a quick-acting coupling (18), an activator (15), a strengthened knife blade housing (17) including a connecting part (22), a knife blade (2) and a gear (16) for transmission of power from a motor to a gear (19) of the knife blade. An axis (20) is marked.

FIG. 5. A replacement unit (23) of the meat piece removing tool, where the replacement unit (23) comprises a cone with a quick-acting coupling (18), an activator (15), a strengthened knife blade housing (17) including a connecting part (22), a knife blade (2) and a gear (16) for transmission of power from a motor to a gear (19) of the knife blade. An axis (20) is marked. The activator (15) determines whether the connecting part (22) of the strengthened knife blade housing (17) is pressed against the cone and the knife blade (2) is secured in the housing (17). The gear (16) transmitting power to the gear (19) of the knife blade is shown non-covered, however the housing (17) may cover this gear.

Figure 6:
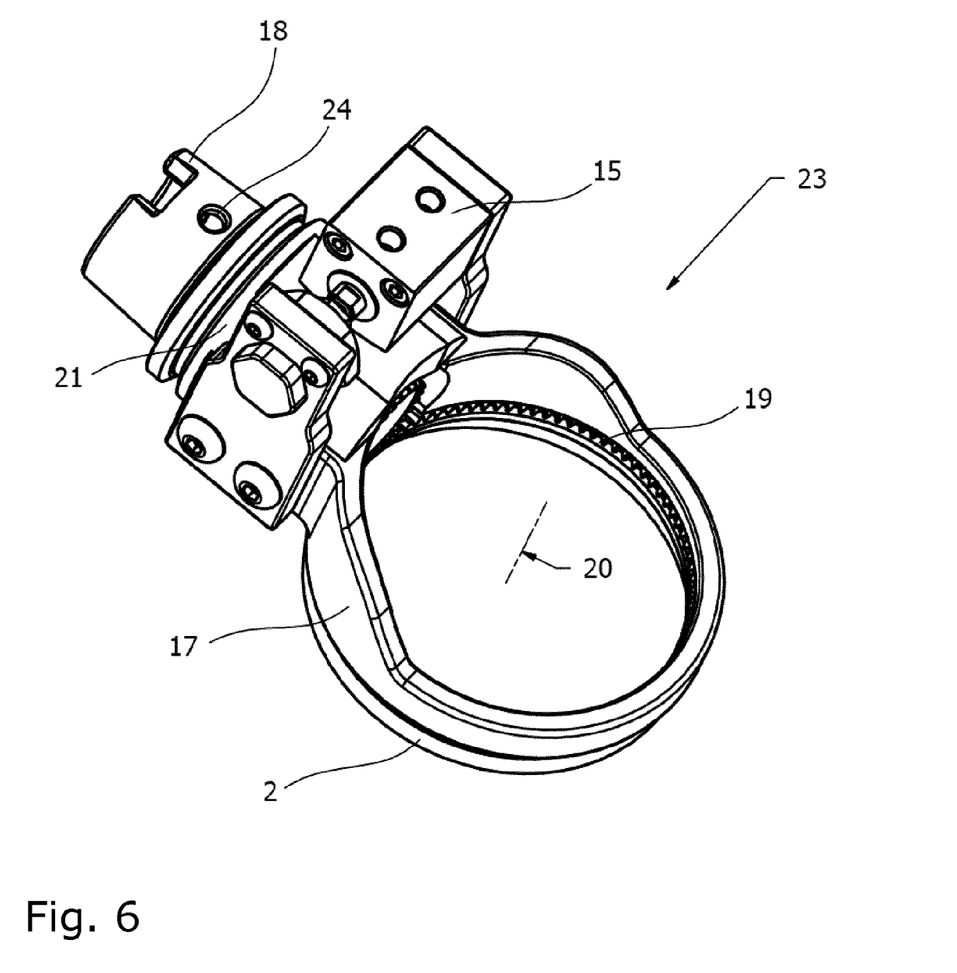
FIG. 6. A replacement unit (23) of the meat piece removing tool, where the replacement unit (23) comprises a cone (21) with a quick-acting coupling (18), an activator (15), a strengthened knife blade housing (17) including a connecting part (22), a knife blade (2) and a pin hole (24).

FIG. 6. A replacement unit (23) of the meat piece removing tool, where the replacement unit (23) comprises a cone (21) with a quick-acting coupling (18), an activator (15), a strengthened knife blade housing (17), a knife blade (2) and a pin hole (24). When the replacement unit (23) is connected to the remaining part of the meat piece removing tool a pin (not shown) may be introduced into the pin hole (24) securing the attachment of the replacement unit (23) when the tool is in function.

Figure 7:
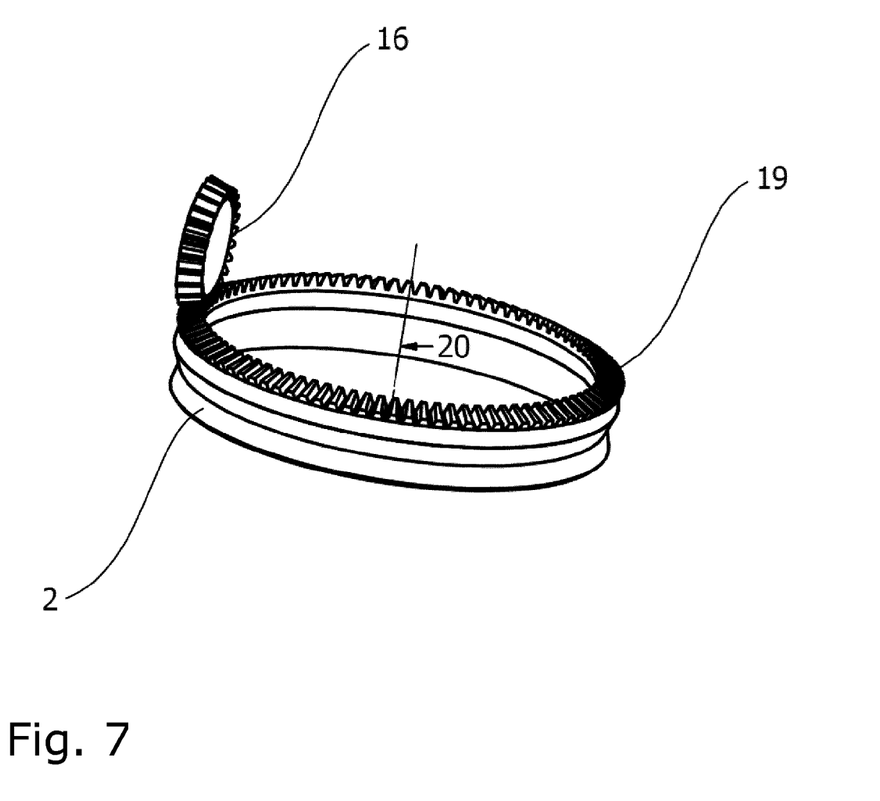
FIG. 7. A round or circular knife blade (2) with gear (19) on the knife blade and the gear (16) of a pinion. An axis (20) is marked.

FIG. 7. A round or circular knife blade (2) with gear (19) on the knife blade and the gear (16) of a pinion. An axis (20) is marked. The gear system is a bevel gear where the figure indicates the direction of the inclination of the inclined gear (16) of the pinion (not shown) and the inclined gear (19) of the knife blade (2). The outwardly projecting cutting edge of the knife blade (2) is indicated.

LIST OF REFERENCE DESIGNATIONS

1 Meat piece removing tool
2 Round or circular knife blade
3 A round or circular blade housing
4 A round or circular cover
5 Knife blade protector
6 Motor
7 Spring means
8 Robot
9 Knife blade protector moving means
10 Hind part of a pig
11 Ham
12 Aitch bone
13 Head of tenderloin
14 Abdominal tissue
15 Activator
16 Gear
17 Strengthened knife blade housing
18 Quick-acting coupling
19 Gear on knife blade
20 Axis
21 Cone
22 Connecting part
23 Replacement unit
24 Pin hole

The invention claimed is:

1. A meat piece removing tool, said tool comprising:
a round or circular knife blade with a cutting edge;
a circular blade housing; and
a movable knife blade protector capable of moving between a position where the cutting edge of the circular knife blade is uncovered or exposed and a position where the cutting edge of the circular knife blade is covered.

2. The tool according to claim 1, said tool further comprising a round or circular cover.

3. The tool according to claim 1, said tool further comprising a motor configured for driving the knife blade.

4. The tool according to claim 1, said tool further comprising spring means allowing the tool to be adaptive.

5. The tool according to claim 1, further comprising knife blade protector moving means, and wherein said knife blade protector moving means is connected to the knife blade protector and configured for moving the knife blade protector from a protecting position where the knife blade protector protrudes over the cutting edge of the round or circular knife blade to a non-protecting position where the knife blade protector is retracted and the cutting edge of the round or circular knife blade is exposed.

6. The tool according to claim 1, further comprising a cone with a quick-acting coupling.

7. The meat piece removing tool of claim 1, configured for removing a meat piece from an animal.

8. The tool according to claim 7, wherein the meat piece comprises a tenderloin from the animal.

9. The tool according to claim 8, wherein the animal comprises a pig.

10. The meat piece removing tool of claim 1, wherein the meat piece removing tool is configured on a robot.

11. The tool according to claim 1, wherein the circular blade housing is a strengthened blade housing.

12. A method for removing a meat piece from an animal carcass, said method comprising the steps of:
 a. providing the animal carcass wherein the meat piece to be removed is partly exposed;
 b. providing a robot with a meat piece removing tool, the meat piece removing tool comprising:
  a round or circular knife blade with a cutting edge;
  a circular blade housing; and
  a movable knife blade protector capable of moving between a position where the cutting edge of the circular knife blade is uncovered or exposed and a position where the cutting edge of the circular knife blade is covered;
 c. providing a vision system capable of obtaining and analyzing images of at least part of the animal carcass;
 d. wherein said vision system obtains at least one image of at least a part of said animal carcass and performs an image analysis recognizing a predetermined point of reference of the animal carcass;
 e. wherein said robot is controlled by input from said vision system and said robot steers the meat piece removing tool to cut free at least part of the meat piece of the animal carcass by starting cutting at a pre-calculated distance from said pre-determined point of reference; and
 f. obtaining a meat piece removed from said carcass.

13. The method according to claim 12, wherein following step e) said robot removes the meat piece from the animal carcass.

14. The method according to claim 12, wherein the round or circular knife blade cuts free a tenderloin by cutting from a starting position in the ham of the half carcass or in the head of the tenderloin and the round or circular knife blade cuts until substantially the entire head of the tenderloin is released, and then with the knife blade protector in a protecting position the tenderloin is pulled from the carcass.

15. The method according to claim 12, wherein the starting position for the knife is determined according to the pre-determined point of reference.

16. A method for replacement of a replacement unit, said method comprising the steps of:
- moving a round or circular blade protector upwardly or downwardly according to an axis extending through open parts of a knife blade, a housing and a blade protector allowing the replacement unit to pass the blade protector when being moved;
- loosening the replacement unit by removing a securing element securing the replacement unit to the other part of the tool;
- positioning the replacement unit in an area for used replacement units;
- connecting a ready-to-use replacement unit to the coupling part of the remaining tool part optionally connected to a robot arm, where the ready-to-use replacement unit may be located in an area of an assembly or handling station;
- securing the replacement unit such as by placing the securing element in the coupling part; and
- repositioning the blade protector around part of the knife blade, knife housing, or both.

17. The method of claim 16, wherein the securing element comprises a pin.

* * * * *